(12) United States Patent
Seth

(10) Patent No.: US 12,124,926 B2
(45) Date of Patent: Oct. 22, 2024

(54) SUPPLEMENTING ARTIFICIAL INTELLIGENCE (AI) / MACHINE LEARNING (ML) MODELS VIA ACTION CENTER, AI/ML MODEL RETRAINING HARDWARE CONTROL, AND AI/ML MODEL SETTINGS MANAGEMENT

(71) Applicant: UiPath, Inc., New York, NY (US)

(72) Inventor: Mohit Seth, Delhi (IN)

(73) Assignee: UiPath, Inc., New York, NY (US)

(*) Notice: Subject to any disclaimer, the term of this patent is extended or adjusted under 35 U.S.C. 154(b) by 934 days.

(21) Appl. No.: 17/155,209

(22) Filed: Jan. 22, 2021

(65) Prior Publication Data
US 2022/0188697 A1 Jun. 16, 2022

(30) Foreign Application Priority Data
Dec. 11, 2020 (IN) .............................. 202011053926

(51) Int. Cl.
*G06N 20/00* (2019.01)
(52) U.S. Cl.
CPC .................................. *G06N 20/00* (2019.01)
(58) Field of Classification Search
CPC .............................. G06N 20/00; G06Q 10/06
See application file for complete search history.

(56) References Cited

U.S. PATENT DOCUMENTS

| 10,789,157 | B2 | 9/2020 | Jain et al. |
| 2017/0001308 | A1 | 1/2017 | Bataller et al. |
| 2017/0330109 | A1 | 11/2017 | Maughan et al. |
| 2017/0372232 | A1 | 12/2017 | Maughan et al. |
| 2019/0279109 | A1 | 9/2019 | Guelman |
| 2019/0375109 | A1 | 12/2019 | High et al. |
| 2020/0019882 | A1 | 1/2020 | Garg et al. |
| 2020/0111023 | A1 | 4/2020 | Murugappan et al. |
| 2020/0134374 | A1 | 4/2020 | Oros |

(Continued)

FOREIGN PATENT DOCUMENTS

EP 3570494 A2 11/2019

OTHER PUBLICATIONS

Phothilimthana, Phitchaya Mangpo, et al. "Portable performance on heterogeneous architectures." ACM SIGARCH Computer Architecture News 41.1 (2013): 431-444. (Year: 2013).*

(Continued)

*Primary Examiner* — Eric Nilsson
(74) *Attorney, Agent, or Firm* — LeonardPatel PC; Michael A. Leonard, II; Sheetal S. Patel

(57) ABSTRACT

Supplementing artificial intelligence (AI)/machine learning (ML) models via an action center, providing AI/ML model retraining hardware control, and providing AI/ML model settings management are disclosed. AI/ML models may be deployed on hosting infrastructure where the AI/ML models can be called by robotic process automation (RPA) robots. When the performance of an AI/ML model falls below a threshold, the result of the AI/ML model prediction and other data is sent to an action center where a human reviews the data using a suitable application and approves the prediction or provides a correction if the prediction is wrong. This action center-approved result is then sent to the RPA robot to be used instead of the prediction from the AI/ML model.

29 Claims, 8 Drawing Sheets

(56) References Cited

U.S. PATENT DOCUMENTS

2020/0201727 A1    6/2020   Nie et al.
2022/0094606 A1*  3/2022   Casey .................... H04L 43/04

OTHER PUBLICATIONS

Avliotis, Angelos. "Business process management and robotic process automation: early deployment of a combined approach." Jun. 2019. Retrieved from <https://dspace.lib.uom.gr/handle/2159/24644>. (Year: 2019).*

Kubernetes "Managing Resources for Containers" page available at https://kubernetes.io/docs/concepts/configuration/manage-resources-containers/#requests-and-limits (last accessed Nov. 16, 2020).

First Examination Report issued in Indian Application No. 202011053926 on Aug. 30, 2023.

Kedi et al., "CMS: A Continuous Machine-Learning and Serving Platform for Industrial Big Data," Future Internet, vol. 12, No. 6, p. 102 (Jun. 10, 2020).

Supplementary European Search Report issued in European Application No. 21820838.7 on Jul. 12, 2023.

International Search Report & Written Opinion, issued Feb. 15, 2022, PCT Patent Application No. PCT/US21/56921.

* cited by examiner

SUPPLEMENTING ARTIFICIAL INTELLIGENCE (AI) / MACHINE LEARNING (ML) MODELS VIA ACTION CENTER, AI/ML MODEL RETRAINING HARDWARE CONTROL, AND AI/ML MODEL SETTINGS MANAGEMENT

CLAIM FOR PRIORITY UNDER 35 U.S.C. § 119

This application claims the benefit of Indian Patent Application No. 202011053926 filed Dec. 11, 2020. The subject matter of this earlier filed application is hereby incorporated by reference in its entirety.

FIELD

The present invention generally relates to artificial intelligence (AI) and machine learning (ML), and more specifically, to supplementing AI/ML models via an action center, AI/ML model retraining hardware control, and AI/ML model settings management.

BACKGROUND

AI/ML models may be beneficial in robotic process automation (RPA) in order to automate steps that are difficult to define, have high variability, and require a probabilistic approach. AI/ML models that are callable by RPA robots may be deployed on suitable infrastructure. When called by an RPA robot, for instance, such AI/ML models may return a result (e.g., a prediction) and a confidence. However, over time, AI/ML models may become less accurate due to data and/or model drift.

Typically, when the accuracy of an AI/ML model decreases, labeled training data is acquired and used to retrain the AI/ML model in an attempt to improve its performance. However, the process of obtaining labeled training data can be expensive and time consuming, retraining can take a non-trivial amount of time, and the AI/ML model is less accurate than desired until a retrained AI/ML model can be provided. Also, there is no control over what hardware is used for retraining. Accordingly, an improved approach to AI/ML model retraining and management may be beneficial.

SUMMARY

Certain embodiments of the present invention may provide solutions to the problems and needs in the art that have not yet been fully identified, appreciated, or solved by current RPA technologies. For example, some embodiments of the present invention pertain to supplementing AI/ML models via an action center, AI/ML model retraining hardware control, and AI/ML model settings management.

In an embodiment, a system includes a server that includes one or more AI/ML models or has access to the one or more AI/ML models. The system also includes one or more RPA robots configured to call at least one of the one or more AI/ML models during execution and an action center. The server is configured to monitor performance of the one or more AI/ML models and receive a request from a calling RPA robot of the one or more RPA robots to execute an AI/ML model of the one or more AI/ML models. When performance of the requested AI/ML model falls below one or more performance thresholds for a first time, over a time period, or over a number of runs of the requested AI/ML model, the server is configured to send a review request to the action center to review a result of the execution of the requested AI/ML model. The action center is configured to receive an indication from an action center application that the result is correct or receive a corrected result from the action center application. When the result is incorrect, the action center is also configured to provide the corrected result from the action center to the calling RPA robot, to the server, or both.

In another embodiment, a computer-implemented method includes receiving a request to review a result from an AI/ML model, by an action center application, and displaying an image analyzed by the AI/ML model and one or more parameters for the result on a display, by the action center application. The one or more parameters include a prediction by the AI/ML model. The computer-implemented method also includes receiving a correction to at least one of the one or more parameters, by the action center application, and sending the correction to a server for retraining of the AI/ML model.

In yet another embodiment, a non-transitory computer-readable medium stores a computer program. The computer program is configured to cause at least one processor to execute AI/ML models requested by RPA robots and monitor performance of the AI/ML models. When performance of an AI/ML model of the AI/ML models falls below one or more performance thresholds for a first time, over a time period, or over a number of runs of the AI/ML model, the computer program is configured to cause the at least one processor to send a review request to an action center to review a result of the execution of the AI/ML model.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which.

Unless otherwise indicated, similar reference characters denote corresponding features consistently throughout the attached drawings.

DETAILED DESCRIPTION OF THE EMBODIMENTS

Figure 1:
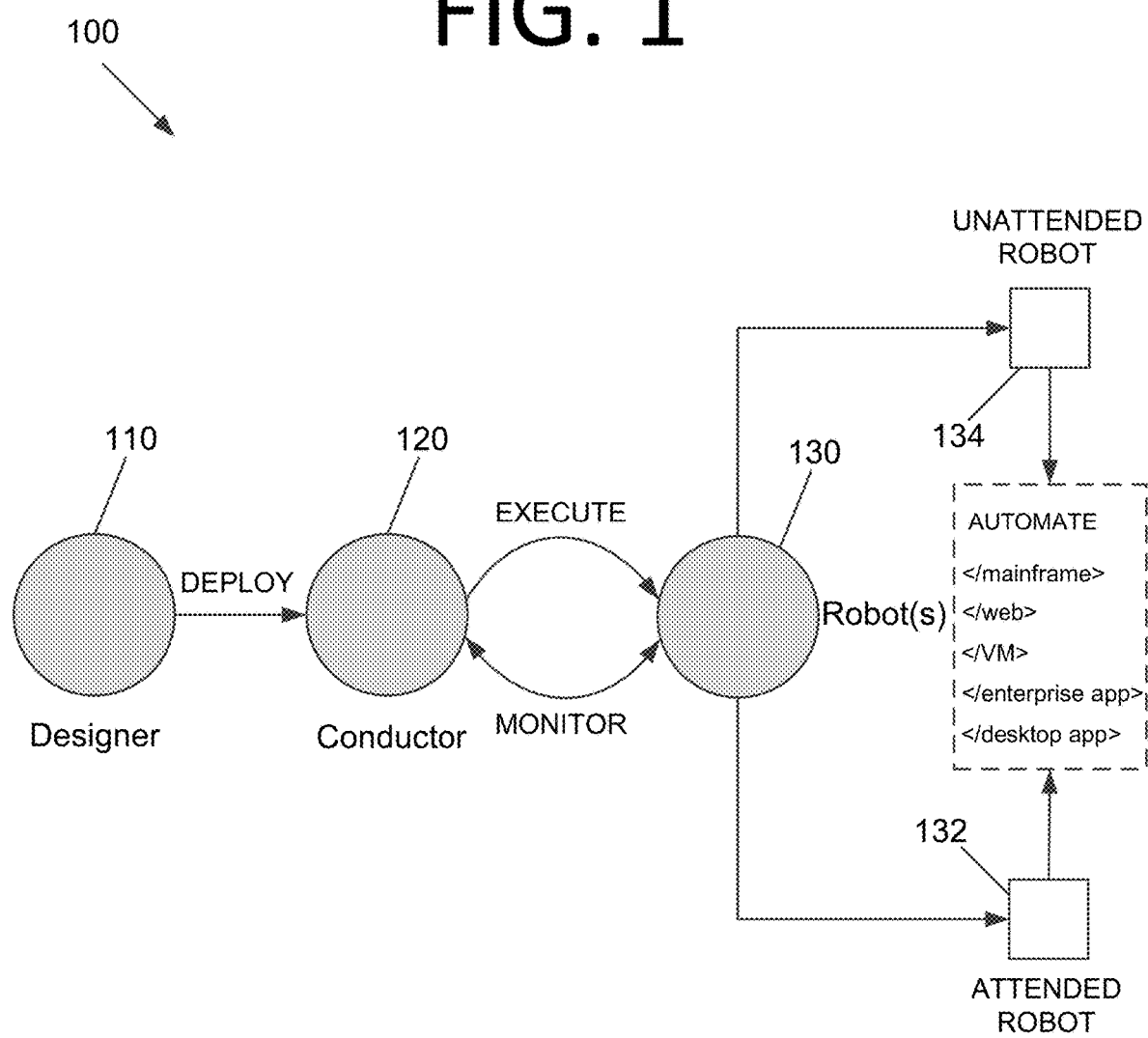
FIG. 1 is an architectural diagram illustrating an RPA system, according to an embodiment of the present invention.

Some embodiments pertain to supplementing AI/ML models via an action center, AI/ML model retraining hardware control, and AI/ML model settings management. AI/ML models may be deployed on hosting infrastructure where the AI/ML models can be called by RPA robots. For instance, in some embodiments, a customer may deploy AI/ML models on a system hosted by an RPA service provider, and these hosted AI/ML models may then be called by associated activities in the customer's RPA robots. However, in certain embodiments, a customer may host its own AI/ML models on its own system.

The AI/ML model hosting system may monitor the performance of the AI/ML models hosted thereon. The performance of an AI/ML model may fall below a threshold for the first time or with some consistency (e.g., an average performance over a certain time period, over a certain number of runs of the AI/ML model, etc.). For example, a target or expected confidence for a given AI/ML model may be at least 90%, but the confidence may fall to 89%, 85%, 70%, etc. When this occurs, in some embodiments, the result of the AI/ML model execution (e.g., a prediction) and other data (e.g., a screenshot of a user interface (UI) that the AI/ML model was analyzing, a document that the AI/ML model was processing, data pertaining to a sequence of user interactions, data in a database that was being analyzed for patterns, etc.) is sent to an action center where a human reviews the data using a suitable application and approves the prediction or provides a correction if the prediction is wrong. In some embodiments, the action center application may be a human-in-the-loop web application where the action center user sees an image that the AI/ML model was analyzing and values that the AI/ML model provided. See FIG. 7, for example. This action center-approved result (i.e., the approved result predicted by the AI/ML model or the corrected result) is then sent to the RPA robot to be used instead of the prediction from the AI/ML model. Such an approach may provide accurate predictions quickly even if the AI/ML model falls below the target confidence until a retrained AI/ML model can be provided that realizes the desired accuracy. However, in certain embodiments, all AI/ML model predictions may be sent to the action center for human review.

In some embodiments, the prediction from the AI/ML model is sent to the RPA robot, which then determines whether the performance threshold has been met and sends the data for review by a human reviewer in the action center if not. In certain embodiments, the computing system(s) hosting and/or calling the AI/ML model perform this functionality. The results of the human review may then be sent to the hoisting and/or calling computing system and on to the RPA robot, or to the RPA robot directly from the action center.

In some embodiments, logic may be included in the calling activity of the RPA robot or some other activity that causes the RPA robot to wait for the result from the action center. For instance, if an AI/ML model trained to find graphical elements in a UI returns a prediction that a given graphical element is a button with a confidence below the target confidence, the RPA robot may wait for the action center to respond. In some embodiments, the RPA robot may send the data for human review by the action center. In certain embodiments, this data may be sent by a server hosting the AI/ML model, by the AI/ML model itself, by another computing system that can receive communications from the AI/ML model and/or the RPA robot, etc.

In some embodiments, the RPA robot may be configured to wait an amount of time for the confirmation of the result from the action center. If the result is not received within that time period, the RPA robot may attempt to continue its operation using the prediction from the AI/ML model, skip the associated activity in its workflow, take a default action, etc. In certain embodiments, the RPA robot may throw an exception or provide an error message if the result is not received within the time period or the attempt(s) to continue operation are unsuccessful.

By way of nonlimiting example, consider the case where an invoice has a total price field and a vendor field. The target confidence for the AI/ML model is 90%, but the AI/ML model identifies the values in these graphical elements with an 89% confidence. A screenshot of the UI may be sent to an action center so a human reviewer can verify that the vendor name and price provided by the AI/ML model are accurate, send a confirmation if this is the case, and send a correction if the prediction is incorrect.

Corrections made by human reviewers in the action center and the associated data that they reviewed may be stored in a database for subsequent retraining of the AI/ML model. The corrections may be pushed out by a computing system of the reviewer, by the calling RPA robot, by a server that hosts the AI/ML model, etc. This provides a feedback loop that pushes data for retraining while also providing accurate results to the calling RPA robot. Retraining may be performed after a certain amount of training data is received, after a certain time period elapses, after a certain number of corrections are received, etc. If the retrained AI/ML model has a typical confidence higher than the target confidence, or at least higher than the currently deployed AI/ML model, the retrained version may be deployed and used in place of the currently deployed AI/ML model, used in tandem with the currently deployed AI/ML model to obtain the best prediction from the two, etc.

In some embodiments, the AI/ML models may be uploaded as a single image and wrapper and deployed as Docker™ images in a Kubernetes™ cluster. Based on the values that are provided (e.g., a flag or an environment variable), a container can act as a serving prediction caller that calls AI/ML models and returns the results of their execution. Alternatively, the container may be used for training AI/ML models.

In some embodiments, it may be specified whether to use graphics processing units (GPUs), central processing units (CPUs), a combination thereof, first available (e.g., if all GPUs are busy, CPUs can be used instead to start retraining immediately, even though the retraining may take longer than with GPUs), etc. for retraining. In certain embodiments, a user can override these settings. For instance, the user may override "first available" settings and mandate that GPUs be used for retraining once they are available.

In some embodiments, excess capacity may be used for retraining. For instance, if computing system(s) both host and retrain AI/ML models, the computing system(s) may use idle processors (e.g., GPUs and/or CPUs) for retraining, which speeds up the retraining process as fewer hardware resources are consumed by the currently serving AI/ML models. Conversely, in some embodiments, processing resources may be allocated away from retraining when demand for execution of currently serving AI/ML models and/or other services increases. However, in certain embodiments, processors that are already tasked for retraining an AI/ML model may remain committed to retraining even if the demand for execution of currently serving AI/ML models and/or other services increases.

In some embodiments, the system may learn what CPU/GPU resources are optimal for a given AI/ML model. The system may then automatically adjust the combination of CPUs and GPUs (or assign all CPUs or all GPUs) based on the optimal configuration. In some embodiments, CPUs and GPUs may be selected for serving AI/ML models to be called by RPA robots at runtime, and automatic balancing may be performed to provide improved combinations thereof for a given AI/ML model.

In some embodiments, a settings script may be used to manage AI/ML models, for setting hardware resources for serving the AI/ML models, and/or for retraining. For example, in the case of Kubernetes®, when a user specifies a pod, the user may also specify the resources that the container will use, such as CPU, GPU, and/or RAM resources. The resource specifications may be used to determine which node to place the pod on.

```
apiVersion: v1
kind: Pod
metadata:
    name: frontend
spec:
    containers:
    type: "serving"
    - name: aiapp
      image: images.UiPath.example/aiapp:v2
      resources:
          cpupreferred: "false"
          gpupreferred: "true"
          firstavailable: "true"
          usecpu: "true"
          usegpu: "true"
          requests:
              memory: "64Mi"
              cpu: "250m"
              gpu: "1g"
          limits:
              memory: "128Mi"
              cpu: "500m"
              gpu: "2g"
    - name: ai-log-aggregator
      image: images.UiPath.example/ai-log-aggregator:v4
      resources:
          firstavailable: "false"
          usecpu: "true"
          usegpu: "false"
          requests:
              cpu: "250m"
          limits:
              memory: "128Mi"
              cpu: "500m"
```

CPU units are specified in millicpu (m), which is one thousandth of the processing capacity of the CPU. GPU units are specified in whole integer GPUs (g), such as 1 g, 2 g, 10 g, etc. Memory units in this example are specified in mebibytes (Mi), which equals 1,048,576 bytes.

The "type" setting specifies whether the AI/ML model container is for serving an AI/ML model (e.g., the AI/ML model takes in input data and provides results for a calling RPA robot) or retraining the AI/ML model. In the example above, the container is a serving container. The "firstavailable" setting specifies whether to use the first available processing resources. For instance, if only CPUs are available but GPUs are preferred, CPUs will be used. If "firstavailable" is true, "cpupreferred" and "gpupreferred" may be set to specify the preference. Alternatively, if only cpupreferred or gpupreferred is provided, it may be assumed that this processing resource is preferred if the flag is true and the other processing resource is preferred if this flag is false.

The "cpu" and "gpu" settings specify the CPU and GPU resources that will be used. The "usecpu" and "usegpu" flags specify whether to used CPUs or GPUs, respectively. However, in some embodiments, whether to use CPUs or GPUs can be inferred from the "cpu" and "gpu" values. If a value for only one of "cpu" or "cpu" is provided, it may be assumed in some embodiments that the processing resource that was omitted is not desired.

FIG. 1 is an architectural diagram illustrating an RPA system 100, according to an embodiment of the present invention. RPA system 100 includes a designer 110 that allows a developer to design and implement workflows. Designer 110 may provide a solution for application integration, as well as automating third-party applications, administrative Information Technology (IT) tasks, and business IT processes. Designer 110 may facilitate development of an automation project, which is a graphical representation of a business process. Simply put, designer 110 facilitates the development and deployment of workflows and robots.

The automation project enables automation of rule-based processes by giving the developer control of the execution order and the relationship between a custom set of steps developed in a workflow, defined herein as "activities." One commercial example of an embodiment of designer 110 is UiPath Studio™. Each activity may include an action, such as clicking a button, reading a file, writing to a log panel, etc. In some embodiments, workflows may be nested or embedded.

Some types of workflows may include, but are not limited to, sequences, flowcharts, Finite State Machines (FSMs), and/or global exception handlers. Sequences may be particularly suitable for linear processes, enabling flow from one activity to another without cluttering a workflow. Flowcharts may be particularly suitable to more complex business logic, enabling integration of decisions and connection of activities in a more diverse manner through multiple branching logic operators. FSMs may be particularly suitable for large workflows. FSMs may use a finite number of states in their execution, which are triggered by a condition (i.e., transition) or an activity. Global exception handlers may be particularly suitable for determining workflow behavior when encountering an execution error and for debugging processes.

Once a workflow is developed in designer 110, execution of business processes is orchestrated by conductor 120, which orchestrates one or more robots 130 that execute the workflows developed in designer 110. One commercial example of an embodiment of conductor 120 is UiPath Orchestrator™. Conductor 120 facilitates management of the creation, monitoring, and deployment of resources in an environment. Conductor 120 may act as an integration point with third-party solutions and applications.

Conductor 120 may manage a fleet of robots 130, connecting and executing robots 130 from a centralized point. Types of robots 130 that may be managed include, but are not limited to, attended robots 132, unattended robots 134, development robots (similar to unattended robots 134, but used for development and testing purposes), and nonproduction robots (similar to attended robots 132, but used for development and testing purposes). Attended robots 132 are triggered by user events and operate alongside a human on the same computing system. Attended robots 132 may be used with conductor 120 for a centralized process deployment and logging medium. Attended robots 132 may help the human user accomplish various tasks, and may be triggered by user events. In some embodiments, processes cannot be started from conductor 120 on this type of robot and/or they cannot run under a locked screen. In certain embodiments, attended robots 132 can only be started from a robot tray or from a command prompt. Attended robots 132 should run under human supervision in some embodiments.

Unattended robots 134 run unattended in virtual environments and can automate many processes. Unattended robots 134 may be responsible for remote execution, monitoring, scheduling, and providing support for work queues. Debugging for all robot types may be run in designer 110 in some embodiments. Both attended and unattended robots may automate various systems and applications including, but not limited to, mainframes, web applications, VMs, enterprise applications (e.g., those produced by SAP®, SalesForce®, Oracle®, etc.), and computing system applications (e.g., desktop and laptop applications, mobile device applications, wearable computer applications, etc.).

Conductor 120 may have various capabilities including, but not limited to, provisioning, deployment, configuration, queueing, monitoring, logging, and/or providing interconnectivity. Provisioning may include creating and maintenance of connections between robots 130 and conductor 120 (e.g., a web application). Deployment may include assuring the correct delivery of package versions to assigned robots 130 for execution. Configuration may include maintenance and delivery of robot environments and process configurations. Queueing may include providing management of queues and queue items. Monitoring may include keeping track of robot identification data and maintaining user permissions. Logging may include storing and indexing logs to a database (e.g., an SQL database) and/or another storage mechanism (e.g., ElasticSearch®, which provides the ability to store and quickly query large datasets). Conductor 120 may provide interconnectivity by acting as the centralized point of communication for third-party solutions and/or applications.

Robots 130 are execution agents that run workflows built in designer 110. One commercial example of some embodiments of robot(s) 130 is UiPath Robots™ In some embodiments, robots 130 install the Microsoft Windows® Service Control Manager (SCM)-managed service by default. As a result, such robots 130 can open interactive Windows® sessions under the local system account, and have the rights of a Windows® service.

In some embodiments, robots 130 can be installed in a user mode. For such robots 130, this means they have the same rights as the user under which a given robot 130 has been installed. This feature may also be available for High Density (HD) robots, which ensure full utilization of each machine at its maximum potential. In some embodiments, any type of robot 130 may be configured in an HD environment.

Robots 130 in some embodiments are split into several components, each being dedicated to a particular automation task. The robot components in some embodiments include, but are not limited to, SCM-managed robot services, user mode robot services, executors, agents, and command line. SCM-managed robot services manage and monitor Windows® sessions and act as a proxy between conductor 120 and the execution hosts (i.e., the computing systems on which robots 130 are executed). These services are trusted with and manage the credentials for robots 130. A console application is launched by the SCM under the local system.

User mode robot services in some embodiments manage and monitor Windows® sessions and act as a proxy between conductor 120 and the execution hosts. User mode robot services may be trusted with and manage the credentials for robots 130. A Windows® application may automatically be launched if the SCM-managed robot service is not installed.

Executors may run given jobs under a Windows® session (i.e., they may execute workflows. Executors may be aware of per-monitor dots per inch (DPI) settings. Agents may be Windows® Presentation Foundation (WPF) applications that display the available jobs in the system tray window. Agents may be a client of the service. Agents may request to start or stop jobs and change settings. The command line is a client of the service. The command line is a console application that can request to start jobs and waits for their output.

Having components of robots 130 split as explained above helps developers, support users, and computing systems more easily run, identify, and track what each component is executing. Special behaviors may be configured per component this way, such as setting up different firewall rules for the executor and the service. The executor may always be aware of DPI settings per monitor in some embodiments. As a result, workflows may be executed at any DPI, regardless of the configuration of the computing system on which they were created. Projects from designer 110 may also be independent of browser zoom level in some embodiments. For applications that are DPI-unaware or intentionally marked as unaware, DPI may be disabled in some embodiments.

Figure 2:
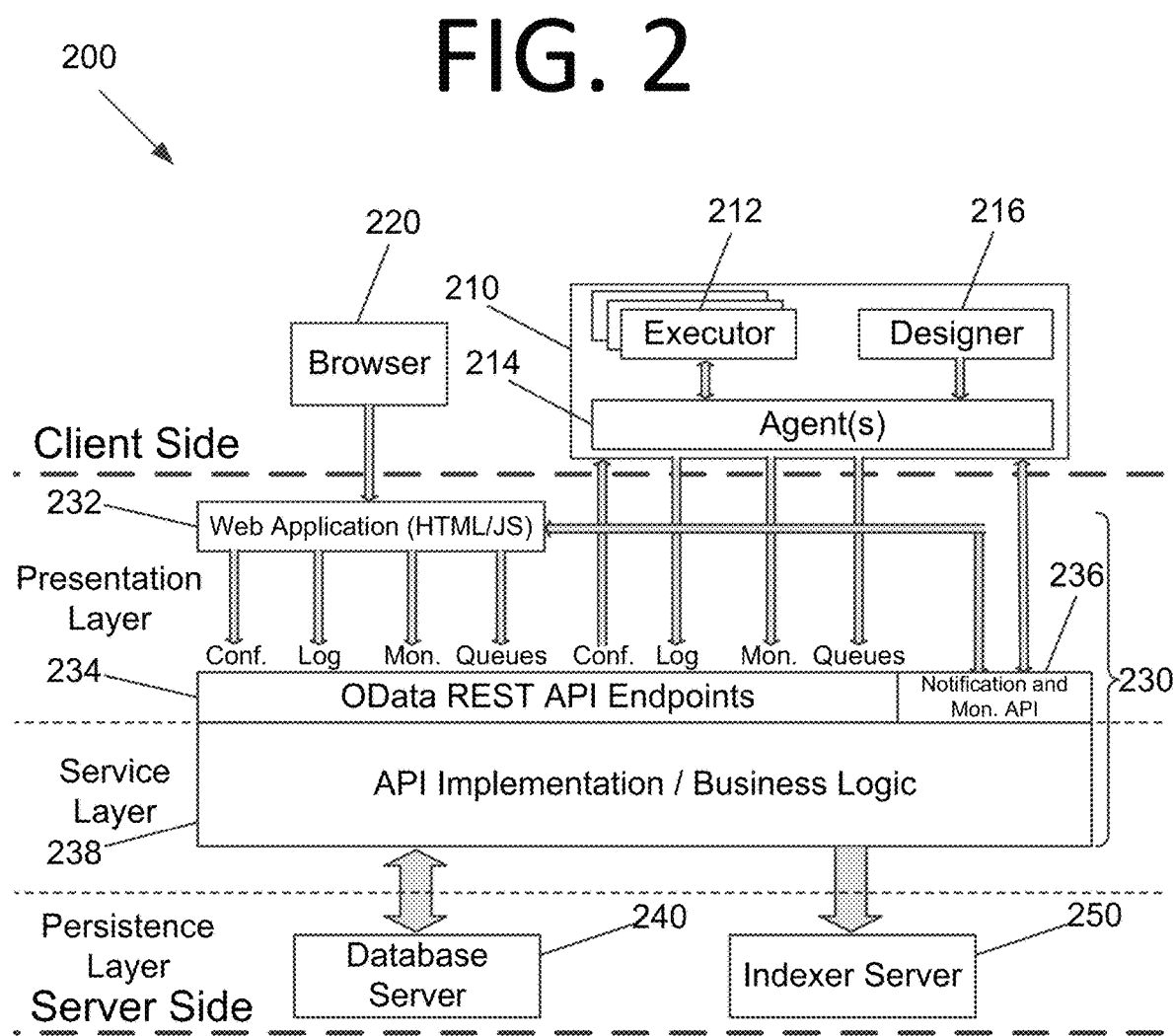
FIG. 2 is an architectural diagram illustrating a deployed RPA system, according to an embodiment of the present invention.

FIG. 2 is an architectural diagram illustrating a deployed RPA system 200, according to an embodiment of the present invention. In some embodiments, RPA system 200 may be, or may be a part of, RPA system 100 of FIG. 1. It should be noted that the client side, the server side, or both, may include any desired number of computing systems without deviating from the scope of the invention. On the client side, a robot application 210 includes executors 212, an agent 214, and a designer 216. However, in some embodiments, designer 216 may not be running on computing system 210. Executors 212 are running processes. Several business projects may run simultaneously, as shown in FIG. 2. Agent 214 (e.g., a Windows® service) is the single point of contact for all executors 212 in this embodiment. All messages in this embodiment are logged into conductor 230, which processes them further via database server 240, indexer server 250, or both. As discussed above with respect to FIG. 1, executors 212 may be robot components.

In some embodiments, a robot represents an association between a machine name and a username. The robot may manage multiple executors at the same time. On computing systems that support multiple interactive sessions running simultaneously (e.g., Windows® Server 2012), multiple robots may be running at the same time, each in a separate Windows® session using a unique username. This is referred to as HD robots above.

Agent 214 is also responsible for sending the status of the robot (e.g., periodically sending a "heartbeat" message indicating that the robot is still functioning) and downloading the required version of the package to be executed. The communication between agent 214 and conductor 230 is always initiated by agent 214 in some embodiments. In the notification scenario, agent 214 may open a WebSocket channel that is later used by conductor 230 to send commands to the robot (e.g., start, stop, etc.).

On the server side, a presentation layer (web application 232, Open Data Protocol (OData) Representative State Transfer (REST) Application Programming Interface (API) endpoints 234, and notification and monitoring 236), a service layer (API implementation/business logic 238), and a persistence layer (database server 240 and indexer server 250) are included. Conductor 230 includes web application 232, OData REST API endpoints 234, notification and monitoring 236, and API implementation/business logic 238. In some embodiments, most actions that a user performs in the interface of conductor 230 (e.g., via browser 220) are performed by calling various APIs. Such actions may include, but are not limited to, starting jobs on robots, adding/removing data in queues, scheduling jobs to run unattended, etc. without deviating from the scope of the invention. Web application 232 is the visual layer of the server platform. In this embodiment, web application 232 uses Hypertext Markup Language (HTML) and JavaScript (JS). However, any desired markup languages, script languages, or any other formats may be used without deviating from the scope of the invention. The user interacts with web pages from web application 232 via browser 220 in this embodiment in order to perform various actions to control conductor 230. For instance, the user may create robot groups, assign packages to the robots, analyze logs per robot and/or per process, start and stop robots, etc.

In addition to web application 232, conductor 230 also includes service layer that exposes OData REST API endpoints 234. However, other endpoints may be included without deviating from the scope of the invention. The REST API is consumed by both web application 232 and agent 214. Agent 214 is the supervisor of one or more robots on the client computer in this embodiment.

The REST API in this embodiment covers configuration, logging, monitoring, and queueing functionality. The configuration endpoints may be used to define and configure application users, permissions, robots, assets, releases, and environments in some embodiments. Logging REST endpoints may be used to log different information, such as errors, explicit messages sent by the robots, and other environment-specific information, for instance. Deployment REST endpoints may be used by the robots to query the package version that should be executed if the start job command is used in conductor 230. Queueing REST endpoints may be responsible for queues and queue item management, such as adding data to a queue, obtaining a transaction from the queue, setting the status of a transaction, etc.

Monitoring REST endpoints may monitor web application 232 and agent 214. Notification and monitoring API 236 may be REST endpoints that are used for registering agent 214, delivering configuration settings to agent 214, and for sending/receiving notifications from the server and agent 214. Notification and monitoring API 236 may also use WebSocket communication in some embodiments.

The persistence layer includes a pair of servers in this embodiment—database server 240 (e.g., a SQL server) and indexer server 250. Database server 240 in this embodiment stores the configurations of the robots, robot groups, associated processes, users, roles, schedules, etc. This information is managed through web application 232 in some embodiments. Database server 240 may manage queues and queue items. In some embodiments, database server 240 may store messages logged by the robots (in addition to or in lieu of indexer server 250).

Indexer server 250, which is optional in some embodiments, stores and indexes the information logged by the robots. In certain embodiments, indexer server 250 may be disabled through configuration settings. In some embodiments, indexer server 250 uses ElasticSearch®, which is an open source project full-text search engine. Messages logged by robots (e.g., using activities like log message or write line) may be sent through the logging REST endpoint (s) to indexer server 250, where they are indexed for future utilization.

Figure 3:
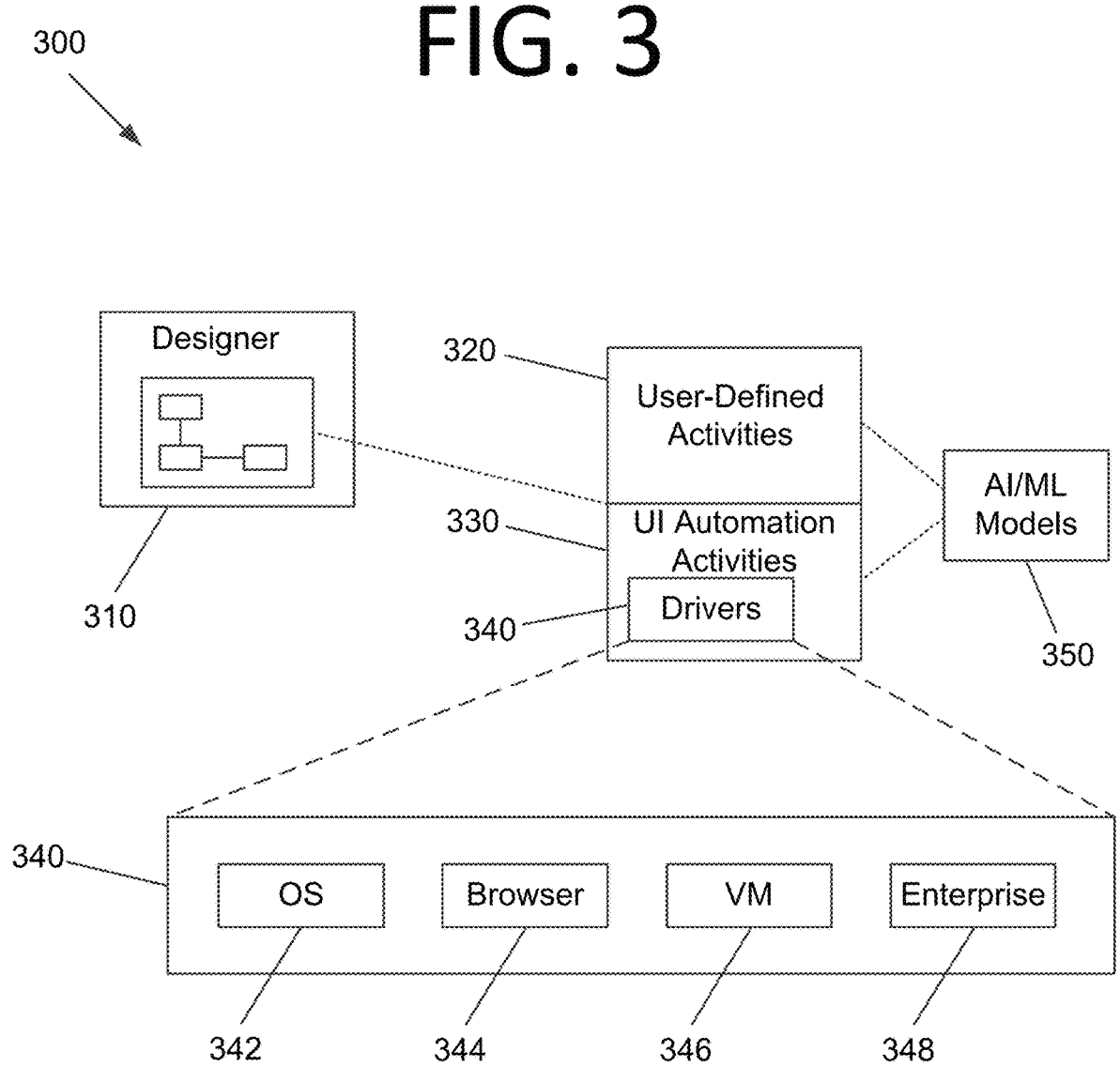
FIG. 3 is an architectural diagram illustrating the relationship between a designer, activities, and drivers, according to an embodiment of the present invention.

FIG. 3 is an architectural diagram illustrating the relationship 300 between a designer 310, activities 320, 330, drivers 340, and AI/ML models 350, according to an embodiment of the present invention. Per the above, a developer uses designer 310 to develop workflows that are executed by robots. Workflows may include user-defined activities 320 and UI automation activities 330. User-defined activities 320 and/or UI automation activities 330 may call one or more AI/ML models 350 in some embodiments, which may be located locally to the computing system on which the robot is operating and/or remotely thereto. Some embodiments are able to identify non-textual visual components in an image, which is called computer vision (CV) herein. Some CV activities pertaining to such components may include, but are not limited to, click, type, get text, hover, element exists, refresh scope, highlight, etc. Click in some embodiments identifies an element using CV, optical character recognition (OCR), fuzzy text matching, and multi-anchor, for example, and clicks it. Type may identify an element using the above and types in the element. Get text may identify the location of specific text and scan it using OCR. Hover may identify an element and hover over it. Element exists may check whether an element exists on the screen using the techniques described above. In some embodiments, there may be hundreds or even thousands of activities that can be implemented in designer 310. However, any number and/or type of activities may be available without deviating from the scope of the invention.

UI automation activities 330 are a subset of special, lower level activities that are written in lower level code (e.g., CV activities) and facilitate interactions with the screen. UI automation activities 330 facilitate these interactions via drivers 340 and/or AI/ML models that allow the robot to interact with the desired software. For instance, drivers 340 may include OS drivers 342, browser drivers 344, VM drivers 346, enterprise application drivers 348, etc. One or more of AI/ML models 350 may be used by UI automation activities 330 in order to determine perform interactions with the computing system. In some embodiments, AI/ML models 350 may augment drivers 340 or replace them completely. Indeed, in certain embodiments, drivers 340 are not included.

Drivers 340 may interact with the OS at a low level looking for hooks, monitoring for keys, etc. They may facilitate integration with Chrome®, IE®, Citrix®, SAP®, etc. For instance, the "click" activity performs the same role in these different applications via drivers 340.

Figure 4:
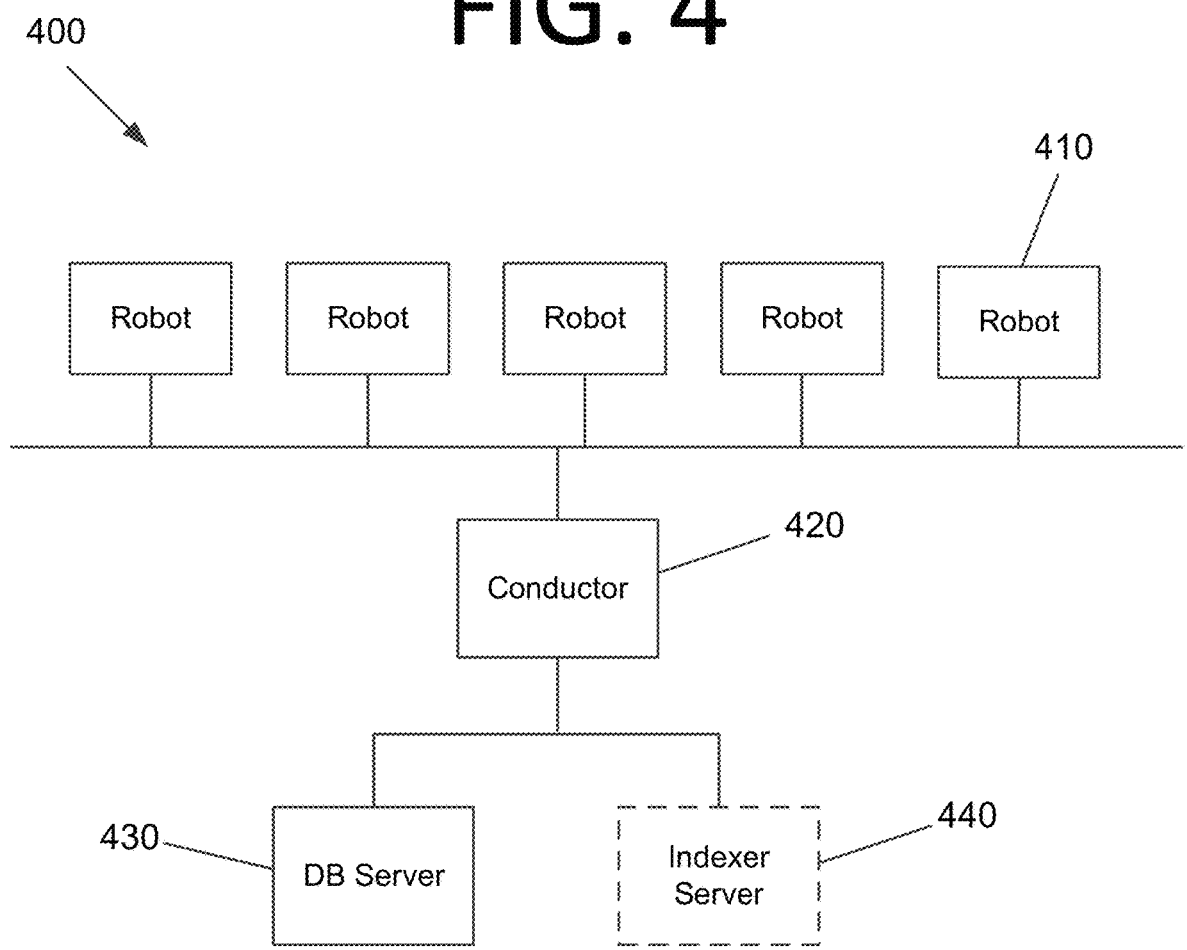
FIG. 4 is an architectural diagram illustrating an RPA system, according to an embodiment of the present invention.

FIG. 4 is an architectural diagram illustrating an RPA system 400, according to an embodiment of the present invention. In some embodiments, RPA system 400 may be or include RPA systems 100 and/or 200 of FIGS. 1 and/or 2. RPA system 400 includes multiple client computing systems 410 running robots. Computing systems 410 are able to communicate with a conductor computing system 420 via a web application running thereon. Conductor computing system 420, in turn, is able to communicate with a database server 430 and an optional indexer server 440.

With respect to FIGS. 1 and 3, it should be noted that while a web application is used in these embodiments, any suitable client/server software may be used without deviating from the scope of the invention. For instance, the conductor may run a server-side application that communicates with non-web-based client software applications on the client computing systems.

Figure 5:
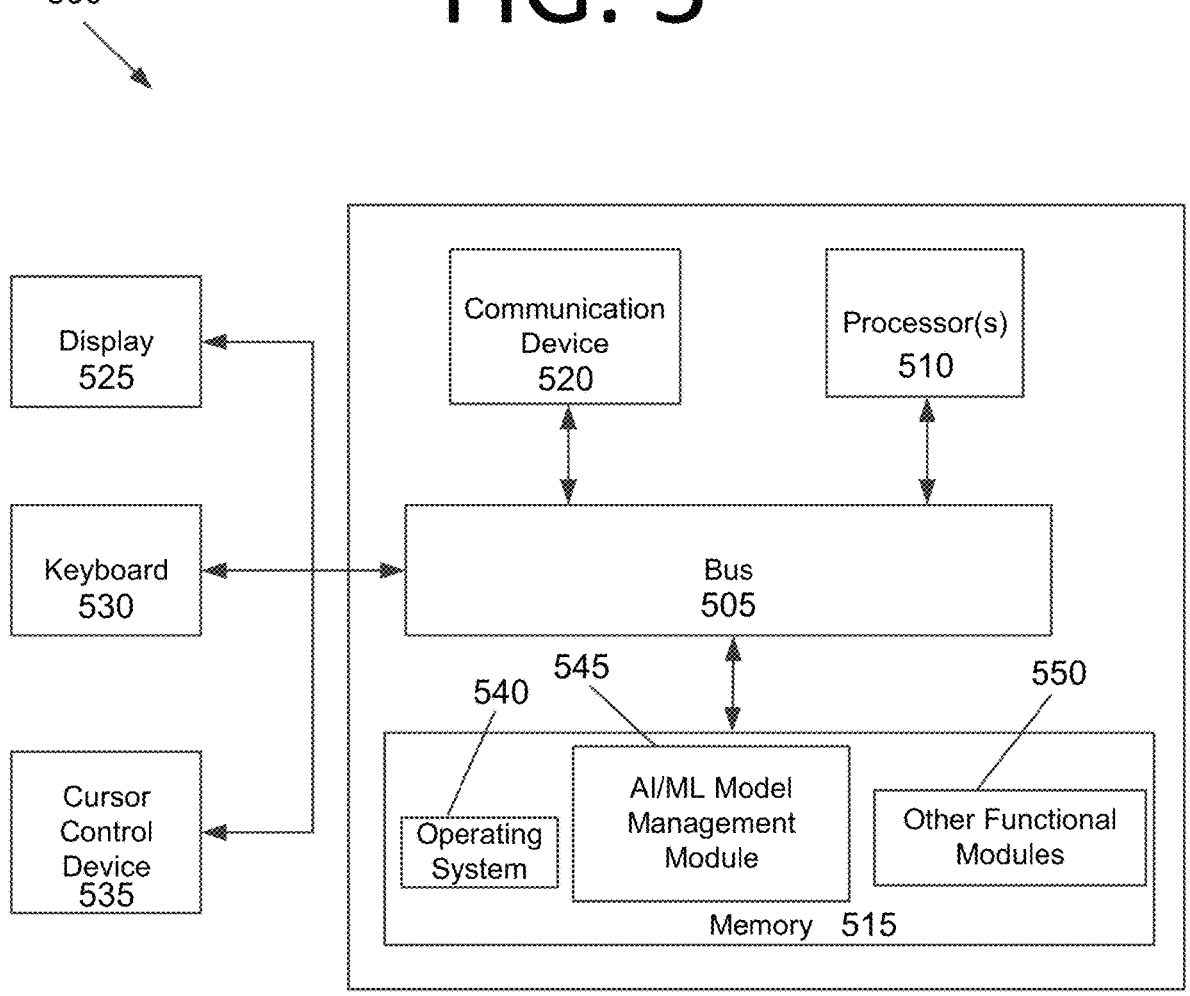
FIG. 5 is an architectural diagram illustrating a computing system configured to supplement AI/ML models via an action center, AI/ML model retraining hardware control, and AI/ML model settings management, according to an embodiment of the present invention.

FIG. 5 is an architectural diagram illustrating a computing system 500 configured to supplement AI/ML models via an action center, provide AI/ML model retraining hardware control, and provide AI/ML model settings management, according to an embodiment of the present invention. In some embodiments, computing system 500 may be one or more of the computing systems depicted and/or described herein. Computing system 500 includes a bus 505 or other communication mechanism for communicating information, and processor(s) 510 coupled to bus 505 for processing information. Processor(s) 510 may be any type of general or specific purpose processor, including a Central Processing Unit (CPU), an Application Specific Integrated Circuit (ASIC), a Field Programmable Gate Array (FPGA), a Graphics Processing Unit (GPU), multiple instances thereof, and/or any combination thereof. Processor(s) 510 may also have multiple processing cores, and at least some of the cores may be configured to perform specific functions. Multi-parallel processing may be used in some embodiments. In certain embodiments, at least one of processor(s) 510 may be a neuromorphic circuit that includes processing elements that mimic biological neurons. In some embodiments, neuromorphic circuits may not require the typical components of a Von Neumann computing architecture.

Computing system 500 further includes a memory 515 for storing information and instructions to be executed by processor(s) 510. Memory 515 can be comprised of any combination of Random Access Memory (RAM), Read Only Memory (ROM), flash memory, cache, static storage such as a magnetic or optical disk, or any other types of non-transitory computer-readable media or combinations thereof. Non-transitory computer-readable media may be any available media that can be accessed by processor(s) 510 and may include volatile media, non-volatile media, or both. The media may also be removable, non-removable, or both.

Additionally, computing system 500 includes a communication device 520, such as a transceiver, to provide access to a communications network via a wireless and/or wired connection. In some embodiments, communication device 520 may be configured to use Frequency Division Multiple Access (FDMA), Single Carrier FDMA (SC-FDMA), Time Division Multiple Access (TDMA), Code Division Multiple Access (CDMA), Orthogonal Frequency Division Multiplexing (OFDM), Orthogonal Frequency Division Multiple Access (OFDMA), Global System for Mobile (GSM) communications, General Packet Radio Service (GPRS), Universal Mobile Telecommunications System (UMTS), cdma2000, Wideband CDMA (W-CDMA), High-Speed Downlink Packet Access (HSDPA), High-Speed Uplink Packet Access (HSUPA), High-Speed Packet Access (HSPA), Long Term Evolution (LTE), LTE Advanced (LTE-A), 802.11x, Wi-Fi, Zigbee, Ultra-WideBand (UWB), 802.16x, 802.15, Home Node-B (HnB), Bluetooth, Radio Frequency Identification (RFID), Infrared Data Association (IrDA), Near-Field Communications (NFC), fifth generation (5G), New Radio (NR), any combination thereof, and/or any other currently existing or future-implemented communications standard and/or protocol without deviating from the scope of the invention. In some embodiments, communication device 520 may include one or more antennas that are singular, arrayed, phased, switched, beamforming, beam-steering, a combination thereof, and or any other antenna configuration without deviating from the scope of the invention.

Processor(s) 510 are further coupled via bus 505 to a display 525, such as a plasma display, a Liquid Crystal Display (LCD), a Light Emitting Diode (LED) display, a Field Emission Display (FED), an Organic Light Emitting Diode (OLED) display, a flexible OLED display, a flexible substrate display, a projection display, a 4K display, a high definition display, a Retina® display, an In-Plane Switching (IPS) display, or any other suitable display for displaying information to a user. Display 525 may be configured as a touch (haptic) display, a three dimensional (3D) touch display, a multi-input touch display, a multi-touch display, etc. using resistive, capacitive, surface-acoustic wave (SAW) capacitive, infrared, optical imaging, dispersive signal technology, acoustic pulse recognition, frustrated total internal reflection, etc. Any suitable display device and haptic I/O may be used without deviating from the scope of the invention.

A keyboard 530 and a cursor control device 535, such as a computer mouse, a touchpad, etc., are further coupled to bus 505 to enable a user to interface with computing system. However, in certain embodiments, a physical keyboard and mouse may not be present, and the user may interact with the device solely through display 525 and/or a touchpad (not shown). Any type and combination of input devices may be used as a matter of design choice. In certain embodiments, no physical input device and/or display is present. For instance, the user may interact with computing system 500 remotely via another computing system in communication therewith, or computing system 500 may operate autonomously.

Memory 515 stores software modules that provide functionality when executed by processor(s) 510. The modules include an operating system 540 for computing system 500. The modules further include an AI/ML model management module 545 that is configured to perform all or part of the processes described herein or derivatives thereof. Computing system 500 may include one or more additional functional modules 550 that include additional functionality.

One skilled in the art will appreciate that a "system" could be embodied as a server, an embedded computing system, a personal computer, a console, a personal digital assistant (PDA), a cell phone, a tablet computing device, a quantum computing system, or any other suitable computing device, or combination of devices without deviating from the scope of the invention. Presenting the above-described functions as being performed by a "system" is not intended to limit the scope of the present invention in any way, but is intended to provide one example of the many embodiments of the present invention. Indeed, methods, systems, and apparatuses disclosed herein may be implemented in localized and distributed forms consistent with computing technology, including cloud computing systems. The computing system could be part of or otherwise accessible by a local area network (LAN), a mobile communications network, a satellite communications network, the Internet, a public or private cloud, a hybrid cloud, a server farm, any combination thereof, etc. Any localized or distributed architecture may be used without deviating from the scope of the invention.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, include one or more physical or logical blocks of computer instructions that may, for instance, be organized as an object, procedure, or function. Nevertheless, the executables of an identified module need not be physically located together, but may include disparate instructions stored in different locations that, when joined logically together, comprise the module and achieve the stated purpose for the module. Further, modules may be stored on a computer-readable medium, which may be, for instance, a hard disk drive, flash device, RAM, tape, and/or any other such non-transitory computer-readable medium used to store data without deviating from the scope of the invention.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Figure 6:
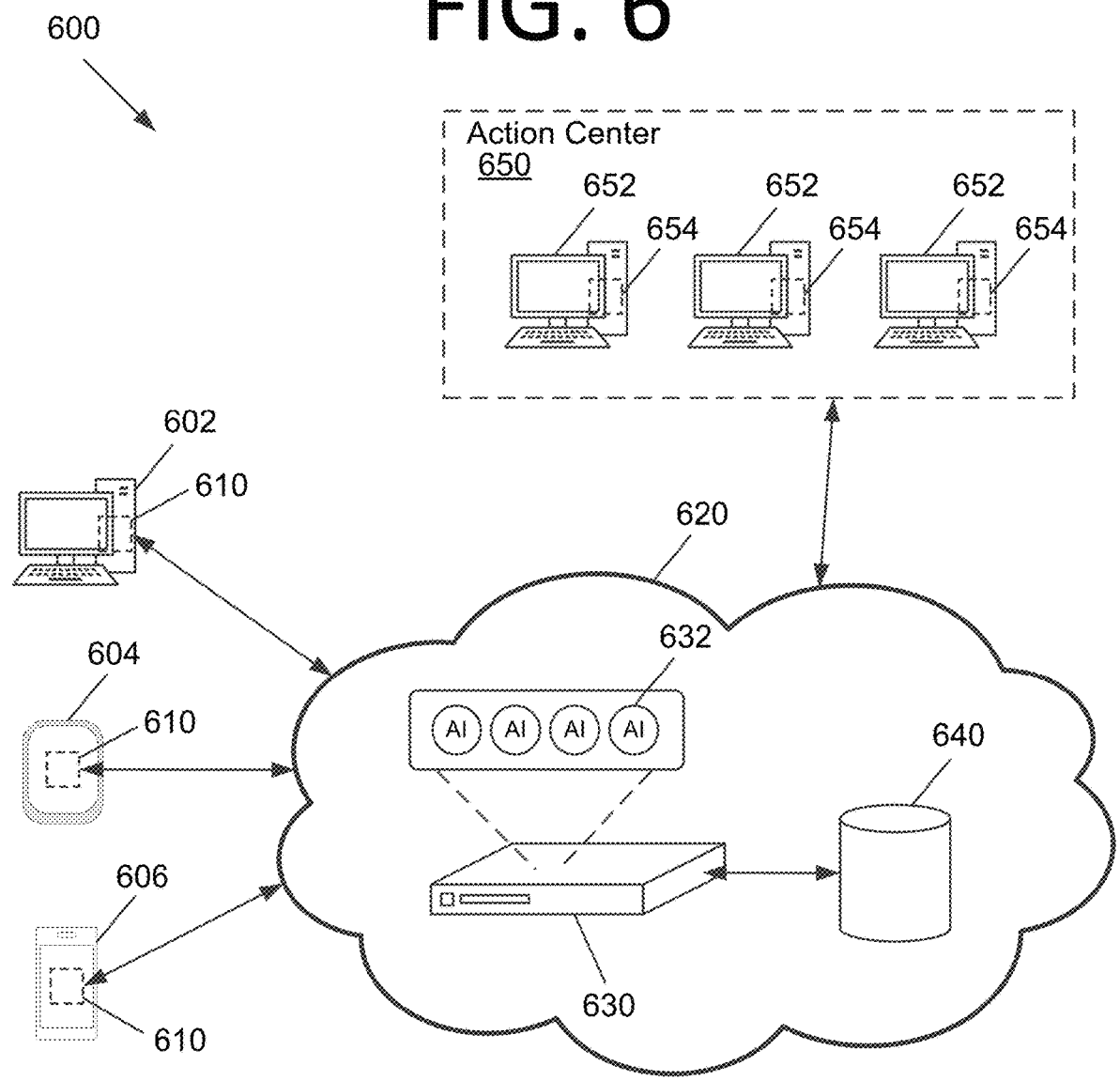
FIG. 6 is an architectural diagram illustrating a system configured to supplement AI/ML models via an action center, provide AI/ML model retraining hardware control, and provide AI/ML model settings management, according to an embodiment of the present invention.

FIG. 6 is an architectural diagram illustrating a system 600 configured to supplement AI/ML models via an action center, provide AI/ML model retraining hardware control, and provide AI/ML model settings management, according to an embodiment of the present invention. System 600 includes user computing systems, such as desktop computer 602, tablet 604, and smart phone 606. However, any desired computing system may be used without deviating from the scope of invention including, but not limited to, smart watches, laptop computers, etc. Also, while three user computing systems are shown in FIG. 6, any suitable number of computing systems may be used without deviating from the scope of the invention. For instance, in some embodiments, dozens, hundreds, thousands, or millions of computing systems may be used.

Each computing system 602, 604, 606 has an RPA robot 610 that calls AI/ML model(s) in the performance of certain tasks (e.g., one or more of AI/ML models 632, either chained or unchained). For example, one or more of RPA robots 610 may call AI/ML models that are trained to use CV to recognize what the user is doing on the respective computing system. Computing systems 602, 604, 606 send information, such as requests for execution of AI/ML models 632 and associated input information, via a network 620 (e.g., a local area network (LAN), a mobile communications network, a satellite communications network, the Internet, any combination thereof, etc.) to a server 630. In some embodiments, server 630 may be part of a public cloud architecture, a private cloud architecture, a hybrid cloud architecture, etc.

In certain embodiments, server 630 may host multiple software-based servers on a single computing system 630. In some embodiments, server 630 may be implemented via one or more virtual machines (VMs). In certain embodiments, server 630 may be an "air-gapped" server that does not have Internet connectivity. Server 630 includes AI/ML models 632 in this embodiment that are called by one or more of RPA robots 610 to provide information that assists the respective calling RPA robot in completing an automation. In some embodiments, AI/ML models 632 called by RPA robots 610 may have multiple layers that perform various functions, such as statistical modeling (e.g., hidden Markov models (HMMs)), and utilize deep learning techniques (e.g., long short term memory (LSTM) deep learning, encoding of previous hidden states, etc.) to identify sequences of user interactions.

Server 630, via AI center software running thereon, monitors the performance of AI/ML models 632 and has access to one or more thresholds for AI/ML models 632 that may be stored locally or on database 640, for example. However, in some embodiments, RPA robots 610 may monitor the performance threshold(s). When an AI/ML model 632 falls below the performance threshold(s) for the first time or with some consistency (e.g., an average performance over a certain time period, over a certain number of runs of the AI/ML model, etc.), the result of the AI/ML model execution (e.g., a prediction) and other data (e.g., a screenshot of a user interface (UI) that the AI/ML model was analyzing, a document that the AI/ML model was processing, data pertaining to a sequence of user interactions, data in a database that was being analyzed for patterns, etc.) is sent to action center 650 where a human reviews the data using a review application 654 of a respective computing system 652. If the prediction is correct, the reviewer approves the prediction via review application 654, and if the prediction is incorrect, the reviewer provides the correct prediction. If not previously provided by AI/ML model 632 via server 630, the prediction is provided to RPA robot 610 for use in its automation.

In some embodiments, logic may be included in the calling activity of RPA robot 610 or some other activity that causes RPA robot 610 to wait for the result from action center 650. In some embodiments, RPA robot 610 may send the data for human review by action center 650. In certain embodiments, this data may be sent by server 630, by AI/ML model 632 itself, by another computing system that can receive communications from AI/ML model 632 and/or RPA robot 610, etc.

In some embodiments, RPA robot 610 may be configured to wait an amount of time for the confirmation of the result from action center 650. If the result is not received within that time period, RPA robot 610 may attempt to continue its operation using the prediction from AI/ML model 632, skip the associated activity in its workflow, take a default action, etc. In certain embodiments, RPA robot 610 may throw an exception or provide an error message if the result is not received within the time period or the attempt(s) to continue operation are unsuccessful.

Corrections made by human reviewers in action center 650 and the associated data that they reviewed may be stored in database 640 for subsequent retraining of AI/ML model 632. The corrections may be pushed out by computing system 652 of the reviewer via review application 654, by calling RPA robot 610, by server 630 that hosts AI/ML model 632, etc. This provides a feedback loop that pushes data for retraining while also providing accurate results to calling RPA robot 610. Retraining may be performed by server 630 or some other computing system(s) after a certain amount of training data is received, after a certain time period elapses, after a certain number of corrections are received, etc. If the retrained AI/ML model has a typical confidence higher than the target confidence, or at least higher than currently deployed AI/ML model 632, the retrained version may be deployed and used in place of currently deployed AI/ML model 632, used in tandem with currently deployed AI/ML model 632 to obtain the best prediction from the two, etc.

In some embodiments, AI/ML models 632 may be uploaded as a single image and wrapper and deployed as Docker™ images in a Kubernetes™ cluster. Based on the values that are provided, a container can act as a serving prediction caller that calls AI/ML models 632 and returns the results of their execution. Alternatively, the container may be used for training AI/ML models 632.

In some embodiments, a configuration may be provided to server 630 and/or stored in database 640 for specifying which hardware to use for retraining a given AI/ML model of AI/ML models 632. For instance, it may be specified whether to use graphics processing units (GPUs), central processing units (CPUs), a combination thereof, first available (e.g., if all GPUs are busy, CPUs can be used instead to start retraining immediately, even though the retraining may take longer than with GPUs), etc. for retraining. In certain embodiments, these settings may be overridden, such as by overriding the settings in the configuration and mandating that GPUs be used for retraining once they are available.

In some embodiments, excess capacity may be used for retraining. For instance, if server 630 both hosts and retrains AI/ML models, server 630 may use idle processors (e.g., GPUs and/or CPUs) for retraining, which speeds up the retraining process as fewer hardware resources are consumed by currently serving AI/ML models 632. Conversely, in some embodiments, processing resources may be allocated away from retraining when demand for execution of currently serving AI/ML models 632 and/or other services increases. However, in certain embodiments, processors that are already tasked for retraining AI/ML models may remain committed to retraining even if the demand for execution of currently serving AI/ML models 632 and/or other services increases.

In some embodiments, server 630 may learn what CPU/GPU resources are optimal for a given AI/ML model of AI/ML models 632. Server 630 may then automatically adjust the combination of CPUs and GPUs (or assign all CPUs or all GPUs) based on the optimal configuration. In some embodiments, CPUs and GPUs may be selected for serving AI/ML models 632 to be called by RPA robots 610 at runtime, and automatic balancing may be performed to provide improved combinations thereof for a given AI/ML model of AI/ML models 632.

AI Layers

In some embodiments, multiple AI layers may be used. Each AI layer is an algorithm (or model) that runs on the data, and the AI model itself may be deep learning neural networks (DLNNs) of trained artificial "neurons" that are trained in training data. Layers may be run in series, in parallel, or a combination thereof.

The AI layers may include, but are not limited to, a sequence extraction layer, a clustering detection layer, a visual component detection layer, a text recognition layer (e.g., OCR), an audio-to-text translation layer, or any combination thereof. However, any desired number and type(s) of layers may be used without deviating from the scope of the invention. Using multiple layers may allow the system to develop a global picture of what is happening in the screens. For example, one AI layer could perform OCR, another could detect buttons, another could compare sequences, etc. Patterns may be determined individually by an AI layer or collectively by multiple AI layers.

Figure 7:
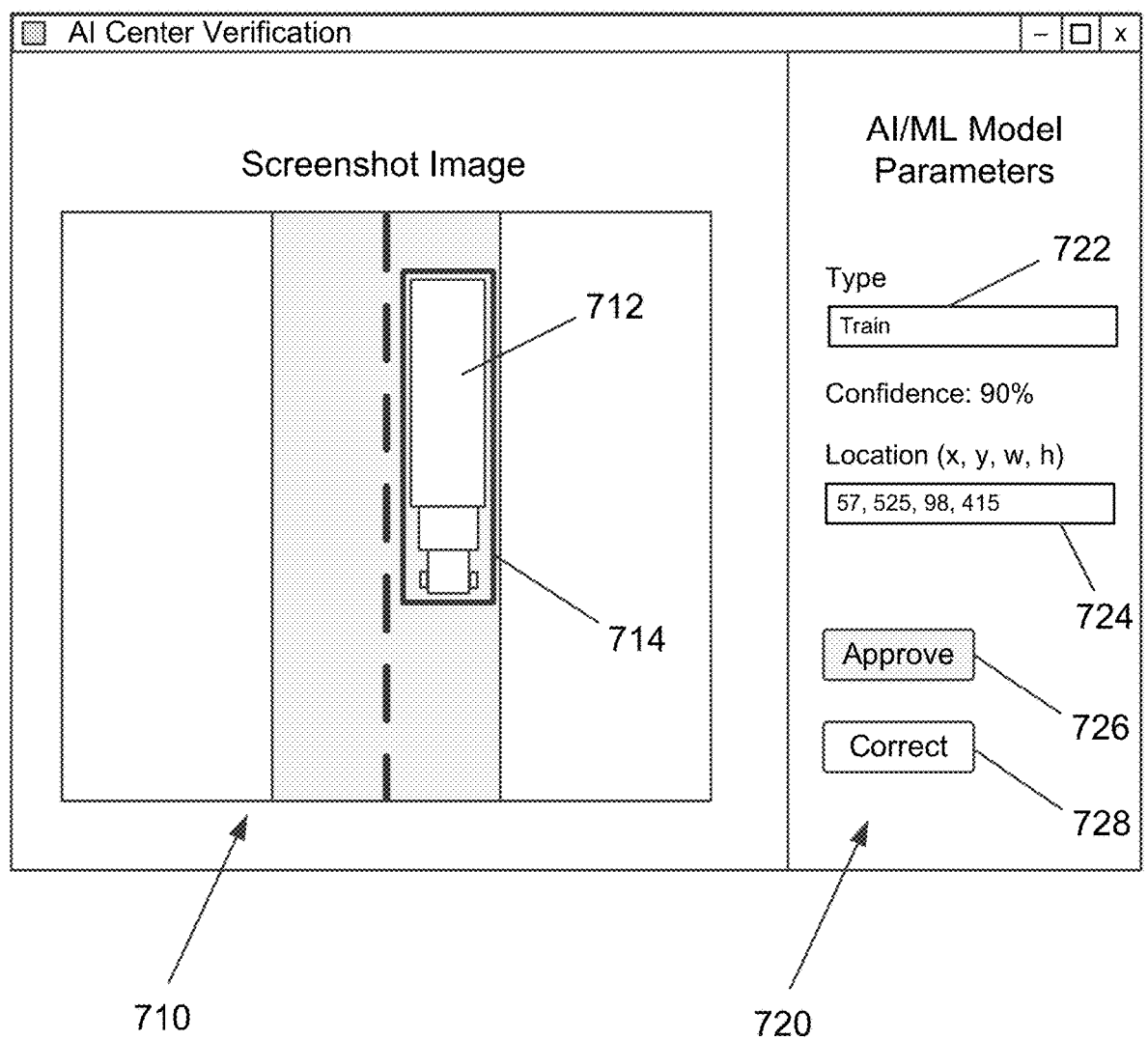
FIG. 7 illustrates an interface for an action center application, according to an embodiment of the present invention.

FIG. 7 illustrates an interface 700 for an action center application, according to an embodiment of the present invention. Interface 700 includes an image display pane 710 that displays the image that an AI/ML model was analyzing and an AI/ML model parameters pane 720 that shows the type of object identified by the AI/ML model and its location. In this example, the AI/ML model has misidentified a truck 712 found in bounding box 714 as a train. The object type identified by the AI/ML model and the location and size of the bounding box 714 are shown in type field 722 and location field 724, respectively. The confidence of the prediction is also shown.

If the AI/ML model had identified the object correctly, the user could click approve button 726 to confirm the identification. In some embodiments, an RPA robot may proceed using the prediction from the AI/ML model regardless of whether the user provides a correction. In certain embodiments, the RPA robot may wait for an indication from the action center application that the prediction from the AI/ML model is accurate.

Since the AI/ML model misidentified the object as a train in this example, the user can correct the type of the object identified in the image by updating field 722. Other corrections can also be made in certain embodiments. For instance, if the object in the image was not identified, or the location of the object is wrong, the user can draw a bounding box around the correct object or enter the parameters manually in this embodiment. After the correction has been made, the user can then click correct button 728 to provide the correction to the RPA robot, provide the correction to a server/database for retraining, or both.

It should be noted that various types of information may be shown in image display pane 710 in some embodiments. For instance, image display pane 710 may show documents (e.g., PDF documents, Microsoft Word® documents, etc.), screenshots of a user interface, or any other content that an AI/ML model is analyzing without deviating from the scope of the invention. Indeed, interface 700 may be configured in any desired manner such that interface 700 is pertinent to the content that the AI/ML model analyzes, its input, and/or its output.

Figure 8:
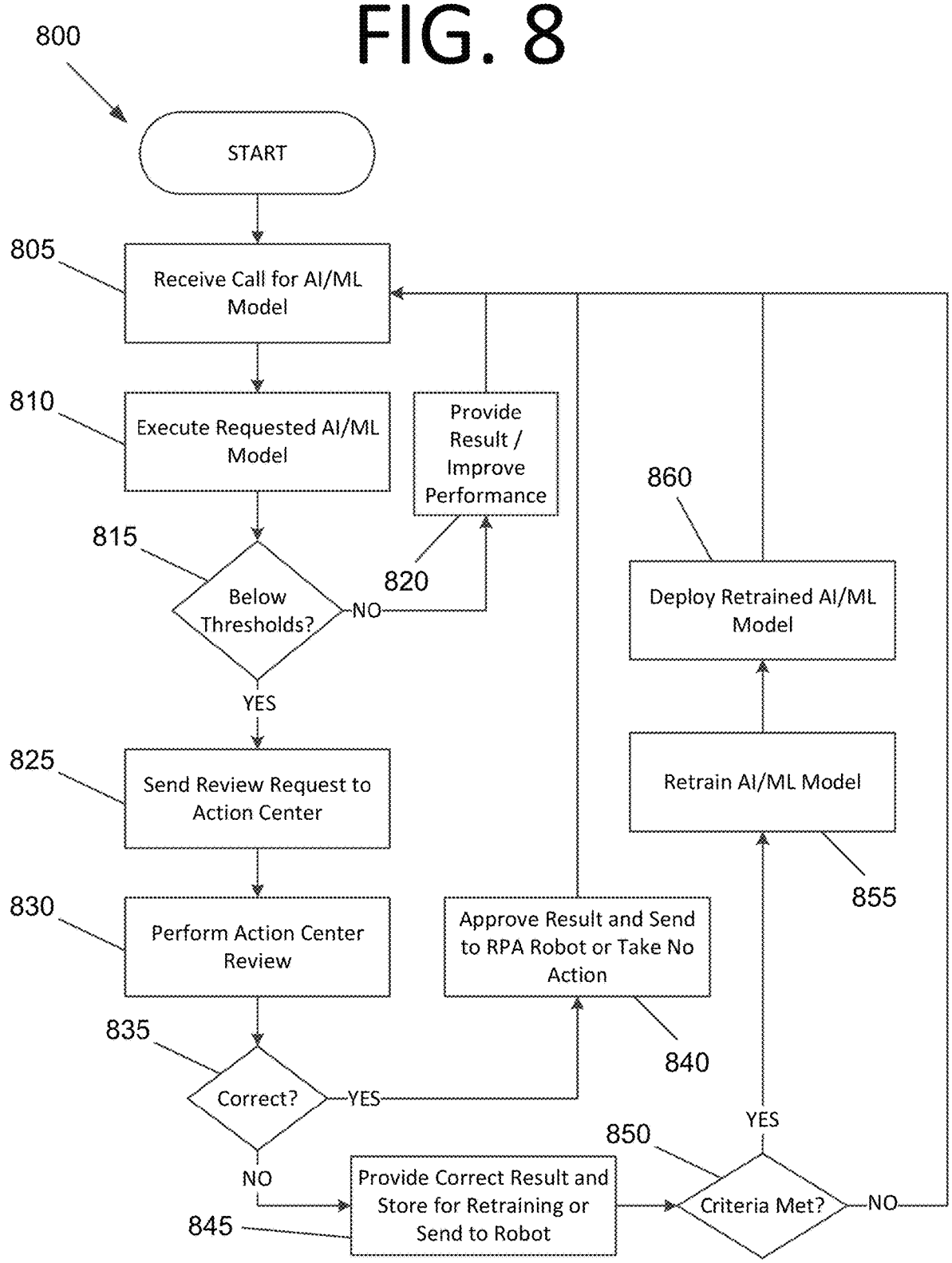
FIG. 8 is a flowchart illustrating a process for supplementing AI/ML models via an action center, providing AI/ML model retraining hardware control, and providing AI/ML model settings management, according to an embodiment of the present invention.

FIG. 8 is a flowchart illustrating a process 800 for supplementing AI/ML models via an action center, providing AI/ML model retraining hardware control, and providing AI/ML model settings management, according to an embodiment of the present invention. The process begins with receiving a call to execute an AI/ML model from an RPA robot at 805 and executing the requested AI/ML model at 810. In some embodiments, when executing the requested AI/ML model, a configuration is used specifying processors to use for retraining the requested AI/ML model. The processors may include GPUs and CPUs, for example. In certain embodiments, the configuration specifies whether to use all GPUs, whether to use all CPUs, or whether to use a combination of GPUs and CPUs. In some embodiments, the configuration specifies to use any available processors when processors of a preferred type are not available. In certain embodiments, idle processors are used for retraining the requested AI/ML model. In some embodiments, processors are added to the retraining of the requested AI/ML model or processors are removed from the retraining of the requested AI/ML model based on demand from RPA robots to execute AL/ML models. In certain embodiments, an activity of the calling RPA robot includes logic that causes the calling RPA robot to wait for a period of time for the result of the execution of the AI/ML model from the action center. In certain embodiments, when the result of the execution of the AI/ML model is not received during the period of time, the RPA robot is configured to attempt to continue operation using the result from the requested AI/ML model, skip an activity associated with the requested AI/ML model, or take a default action.

Threshold monitoring is performed at 815, and if a confidence or some other metric(s) of AI/ML model performance (e.g., a value threshold, a standard deviation, another statistical measure, etc.) are not below the threshold(s), the result of the execution of the AI/ML model is provided to the RPA robot at 820. In certain embodiments, performance may be improved at 820 by learning an optimal combination of processors for executing the requested AI/ML model and the learned optimal combination of processors may be used to perform automatic balancing of the processors for execution of the requested AI/ML model. In some embodiments, the result of the execution of the AI/ML model and potentially the accuracy and/or some other performance metric is provided to the RPA robot regardless of the threshold value(s). In certain embodiments, performance of the requested AI/ML model must fall below one or more performance thresholds for a first time, over a time period, or over a number of runs of the requested AI/ML model for the "YES" branch of step 815 to be taken.

If the threshold(s) are not met at 815, a review request for the AI/ML model result is sent to an action center at 825. In some embodiments, the review request includes a screenshot of an image analyzed by the requested AI/ML model and a prediction from the requested AI/ML model. The action center then performs a review of the result (e.g., via an action center application) at 830. In some embodiments, the review includes receiving the request to review the result from the AI/ML model, displaying an image analyzed by the AI/ML model and one or more parameters for the result on a display of a computing system executing the action center application, and if the result is incorrect, receiving a correction to at least one of the parameters. If the result is correct at 835, the result may be approved via the action center application and sent to the RPA robot, or no further action is taken, at 840.

However, if the result is not correct at 835, the corrected result may be provided via the action center application and the result may be stored for retraining or sent to the calling RPA robot at 845. In the case where the data is sent to the calling RPA robot rather than being stored by the RPA provider for retraining, this may occur when a customer considers the data to be sensitive or proprietary, and thus stores the data locally and retrains on the customer side for security purposes. If retraining criteria are met at 850 (e.g., an amount of training data is received, a period of time elapses, a number of corrections are received from the action center, etc.), the AI/ML model is retrained at 855. The retrained AI/ML model is then deployed at 860. In some embodiments, when the retrained AI/ML model improves with respect to at least one of the performance thresholds, the retained AI/ML model is used in place of or in tandem with the previous version of the AI/ML model, and the best result between the two may be used. In certain embodiments, the retrained AI/ML model is only deployed when the retrained AI/ML model improves the one or more performance thresholds by one or more respective minimum improvement amounts.

The process steps performed in FIG. 8 may be performed by a computer program, encoding instructions for the processor(s) to perform at least part of the process(es) described in FIG. 8, in accordance with embodiments of the present invention. The computer program may be embodied on a non-transitory computer-readable medium. The computer-readable medium may be, but is not limited to, a hard disk drive, a flash device, RAM, a tape, and/or any other such medium or combination of media used to store data. The computer program may include encoded instructions for controlling processor(s) of a computing system (e.g., processor(s) 510 of computing system 500 of FIG. 5) to implement all or part of the process steps described in FIG. 8, which may also be stored on the computer-readable medium.

The computer program can be implemented in hardware, software, or a hybrid implementation. The computer program can be composed of modules that are in operative communication with one another, and which are designed to pass information or instructions to display. The computer program can be configured to operate on a general purpose computer, an ASIC, or any other suitable device.

It will be readily understood that the components of various embodiments of the present invention, as generally described and illustrated in the figures herein, may be arranged and designed in a wide variety of different configurations. Thus, the detailed description of the embodiments of the present invention, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. A system, comprising:
a server comprising one or more artificial intelligence (AI)/machine learning (ML) models or with access to the one or more AI/ML models;
one or more robotic process automation (RPA) robots configured to call at least one of the one or more AI/ML models during execution; and
an action center, wherein
the server is configured to:
monitor performance of the one or more AI/ML models,
receive a request from a calling RPA robot of the one or more RPA robots to execute an AI/ML model of the one or more AI/ML models, and
responsive to performance of the requested AI/ML model falling below one or more performance thresholds for a first time, over a time period, or over a number of runs of the requested AI/ML model, send a review request to the action center to review a result of the execution of the requested AI/ML model, and
the action center is configured to:
receive an indication from an action center application that the result is correct or receive a corrected result from the action center application, and
responsive to the result being incorrect, provide the corrected result from the action center to the calling RPA robot, to the server, or both.

2. The system of claim 1, wherein the server is further configured to:
execute the requested AI/ML model; and
provide a result of the execution of the requested AI/ML model and an accuracy of the result to the calling RPA robot.

3. The system of claim 1, wherein the review request sent by the server to the action center comprises a screenshot of an image analyzed by the requested AI/ML model and a prediction from the requested AI/ML model.

4. The system of claim 1, wherein responsive to the action center providing a correction, the action center or the server are configured to cause data pertaining to the correction to be stored for retraining the requested AI/ML model, to send the data to the calling RPA robot, or both.

5. The system of claim 4, wherein after an amount of training data is received, after a period of time elapses, or after a number of corrections are received from the action center, the server is configured to retrain the requested AI/ML model.

6. The system of claim 5, wherein responsive to the retrained AI/ML model improving with respect to at least one of the one or more performance thresholds, the server is configured to:
deploy the retrained AI/ML model in place of the requested AI/ML model; or
use the retrained AI/ML model in tandem with the requested AI/ML model and obtain a best result from the retrained AI/ML model and the requested AI/ML model.

7. The system of claim 6, wherein the retrained AI/ML model is only deployed responsive to the retrained AI/ML model improving the one or more performance thresholds by one or more respective minimum improvement amounts.

8. The system of claim 5, wherein the server is configured to use a configuration specifying processors to use for retraining the requested AI/ML model, the processors comprising graphics processing units (GPUs) and central processing units (CPUs).

9. The system of claim 8, wherein the configuration specifies whether to use all GPUs, whether to use all CPUs, or whether to use a combination of GPUs and CPUs.

10. The system of claim 8, wherein the configuration specifies using any available processors responsive to processors of a preferred type not being available.

11. The system of claim 8, wherein the server is configured to use idle processors for retraining the requested AI/ML model.

12. The system of claim 8, wherein the server is configured to add processors to the retraining of the requested AI/ML model or remove processors from the retraining of the requested AI/ML model based on demand from the one or more RPA robots for the server to execute the one or more AL/ML models.

13. The system of claim 8, wherein an activity of the calling RPA robot comprises logic that causes the calling RPA robot to wait for a period of time for the result of the execution of the AI/ML model from the action center.

14. The system of claim 13, wherein responsive to the result of the execution of the AI/ML model not being received during the period of time, the RPA robot is configured to attempt to continue operation using the result from the requested AI/ML model, skip an activity associated with the requested AI/ML model, or take a default action.

15. The system of claim 1, wherein the server is configured to learn an optimal combination of processors for executing the requested AI/ML model and use the learned optimal combination of processors to perform automatic balancing of the processors for execution of the requested AI/ML model.

16. The system of claim 1, wherein the action center application is configured to:
receive a request to review the result from the AI/ML model;
display an image analyzed by the AI/ML model and one or more parameters for the result on a display; and
receive a correction to at least one of the one or more parameters.

17. A computer-implemented method, comprising:
receiving a request to review a result from an intelligence (AI)/machine learning (ML) model, by an action center application;
displaying an image analyzed by the AI/ML model and one or more parameters for the result on a display, by the action center application, the one or more parameters comprising a prediction by the AI/ML model;
receiving a correction to at least one of the one or more parameters, by the action center application; and
sending the correction to a server for retraining of the AI/ML model.

18. The computer-implemented method of claim 17, further comprising:

sending the correction to a robotic process automation (RPA) robot that called the AI/ML model, by the action center application, wherein the correction comprises a corrected prediction for the result of the AI/ML model.

19. A non-transitory computer-readable medium storing a computer program, the computer program configured to cause at least one processor to:

execute intelligence (AI)/machine learning (ML) models requested by robotic process automation (RPA) robots;

monitor performance of the AI/ML models; and responsive to performance of an AI/ML model of the AI/ML models falling below one or more performance thresholds for a first time, over a time period, or over a number of runs of the AI/ML model, send a review request to an action center to review a result of the execution of the AI/ML model.

20. The non-transitory computer-readable medium of claim 19, wherein the review request comprises a screenshot of an image analyzed by the AI/ML model and a prediction from the AI/ML model.

21. The non-transitory computer-readable medium of claim 19, wherein the computer program is further configured to cause the at least one processor to:

receive a correction for the AI/ML model from the action center; and store the correction for retraining the AI/ML model.

22. The non-transitory computer-readable medium of claim 19, wherein after an amount of training data is received, after a period of time elapses, or after a number of corrections are received from the action center, the computer program is further configured to cause the at least one processor to:

retrain the AI/ML model; and responsive to the retrained AI/ML model improving with respect to at least one of the one or more performance thresholds:

deploy the retrained AI/ML model in place of a previous version of the AI/ML model; or use the retrained AI/ML model in tandem with the previous version of the AI/ML model and obtain a best result from the retrained AI/ML model and the previous version of the AI/ML model.

23. The non-transitory computer-readable medium of claim 22, wherein the retrained AI/ML model is only deployed responsive to the retrained AI/ML model improving the one or more performance thresholds by one or more respective minimum improvement amounts.

24. The non-transitory computer-readable medium of claim 22, wherein the computer program is further configured to cause the at least one processor to:

use a configuration specifying processors to use for retraining the AI/ML model, the processors comprising graphics processing units (GPUs) and central processing units (CPUs).

25. The non-transitory computer-readable medium of claim 24, wherein the configuration specifies whether to use all GPUs, whether to use all CPUs, or whether to use a combination of GPUs and CPUs.

26. The non-transitory computer-readable medium of claim 24, wherein the configuration specifies using any available processors responsive to processors of a preferred type not being available.

27. The non-transitory computer-readable medium of claim 24, wherein the computer program is further configured to cause the at least one processor to:

use idle processors for retraining the AI/ML model.

28. The non-transitory computer-readable medium of claim 24, wherein the computer program is further configured to cause the at least one processor to:

add processors to the retraining of the AI/ML model or remove processors from the retraining of the AI/ML model based on demand from the RPA robots for the computer program to execute the AL/ML models.

29. The non-transitory computer-readable medium of claim 19, wherein the computer program is further configured to cause the at least one processor to:

learn an optimal combination of processors for executing the AI/ML model and use the learned optimal combination of processors to perform automatic balancing of the processors for execution of the AI/ML model.

\* \* \* \* \*